United States Patent [19]

Tsuzaki et al.

[11] Patent Number: 5,347,187
[45] Date of Patent: Sep. 13, 1994

[54] MINIATURE ELECTRIC MOTOR

[75] Inventors: Toshiaki Tsuzaki; Noriyoshi Naito, both of Yonago, Japan

[73] Assignee: Matsushita Electric Industrial Co., Ltd., Kadoma, Japan

[21] Appl. No.: 913,637

[22] Filed: Jul. 16, 1992

[30] Foreign Application Priority Data

Aug. 29, 1991 [JP] Japan .................. 3-68998[U]
Aug. 29, 1991 [JP] Japan .................. 3-68999[U]

[51] Int. Cl.⁵ .................................................. H02K 5/16
[52] U.S. Cl. ................................. 310/40 MM; 310/89; 310/90
[58] Field of Search .............. 310/40 MM, 42, 90, 91, 310/89, 272, 273; 384/265, 439

[56] References Cited

U.S. PATENT DOCUMENTS

| | | | |
|---|---|---|---|
| 4,128,935 | 12/1978 | Czech et al. | 29/596 |
| 4,409,505 | 10/1983 | Petersen | 310/90 |
| 4,539,499 | 9/1985 | Punch et al. | 310/214 |
| 4,716,327 | 12/1987 | Stone | 310/90 |
| 4,769,566 | 9/1988 | Matsuda | 310/40 MM |
| 4,795,926 | 1/1989 | Someya et al. | 310/90 |
| 4,806,811 | 2/1989 | Mayumi et al. | 310/89 |
| 4,827,167 | 5/1989 | Mayumi et al. | 310/89 |
| 4,896,065 | 1/1990 | Tsuyama | 310/154 |
| 4,961,018 | 10/1990 | Akhter | 310/87 |
| 5,272,403 | 12/1993 | New | 310/90.5 |

FOREIGN PATENT DOCUMENTS 4-28207  7/1992  Japan .

Primary Examiner—Steven L. Stephan
Assistant Examiner—D. R. Haszko
Attorney, Agent, or Firm—Cushman, Darby & Cushman

[57] ABSTRACT

In a miniature electric motor a hollow cylindrical socket (2) is formed by deep drawing process on a roof plate of a frame (1), and in this socket (2) a bearing housing (4) is tightly fit projecting outwardly and inwardly from its roof plane, and at least one bearing metal (3) is further tightly fitted therein in a manner to project from both ends of the bearing housing (4).

By utilizing the draw-worked socket (2) for tightly holding the bearing metal (3), the accuracy of axis or circularity of the bearing hole is assured.

5 Claims, 5 Drawing Sheets

MINIATURE ELECTRIC MOTOR

FIELD OF THE INVENTION AND RELATED ART STATEMENT

1. Field of the Invention

The present invention relates to a miniature electric motor used for driving a variety of household and industrial apparatus such as a compact disc player, a video disc player, or the like.

2. Description of the Prior Art

In recent years, miniature electric motors are being used for such uses as directly driving the disk in such apparatus as the compact disc player and the video disc player. For such a use, it is a main interest to secure the rotor shaft of the motor perpendicularly to a roof plane of the motor housing whereby the motor is usually installed in the apparatus. In addition to this, a reduction in the manufacturing cost of the motor as a component is insistently required so as to correspond with the strenuously sought after to reduce the cost of the electric apparatus.

In the following paragraphs, an example of the conventional miniature motor will be described with reference to FIG. 7. As shown in the cross sectional view of FIG. 7, the conventional motor is comprised mainly of a frame 72 with a bottom plate 80, stator magnets 71 and a rotor 70. In the conventional miniature motor, a bearing housing 74 is secured on the frame 72 by caulking; and the bearing housing 74 contains bearing metals 78 therein. The stator magnets 71 are supported on the interior surface of the frame ? 2. The rotor 70 comprises a rotor shaft 75, a core 77 with coils wounded thereon, and a commutator 78 which keeps a contacting relation with a brush 79 provided on the bottom plate 80. The rotor shaft 75 is rotatably supported by the bearing metals 73 and a thrust block 81 provided on the bottom plate 80.

The disclosed construction of the conventional motor has the following disadvantage due to the caulking of the bearing housing 74 on the frame 72. First, the perpendicularity of the rotor shaft 75 to the roof plane of the frame 72 is never satisfactory when a part of the frame 72, on which the bearing housing is secured, is not accurately flat. This is because the bearing housing 74 has been secured on the frame 72 primarily by caulking, which may invite a deformation of the frame. An ensuring of the sufficient flatness requires a machine-tool cutting on the roof plane of the frame 72 after being press-molded to improve the perpendicularity by the ensured flatness. Such machine-tool cutting step has, however, imposed upon the miniature electric motor an additional working cost. In addition to this, the caulking of the bearing housing 74 on the frame 72 may deteriorate an intrinsic circularity of the bore of the bearing housing 72 and thus that of the bearing metals 73.

OBJECT AND SUMMARY OF THE INVENTION

The present invention overcomes the above-mentioned disadvantages inherent to the conventional structure, and has, as its object, a provision of a miniature electric motor which is excellent in maintaining the perpendicularity of the rotor shaft to the roof plane of the frame as well as in maintaining the intrinsic circularity of the bearing metals, and also advantageous in low working cost of its components.

According to the present invention, there is provided a miniature electric motor comprising:
- a rotor with a rotor shaft,
- a stator, and
- a frame of generally cylindrical bowl shape with a bottom plate for supporting and enclosing the stator and the rotor, wherein;
  the frame has a hollow cylindrical socket for holding at least one bearing metal projecting outwardly from its roof plane, the at least one bearing metal is tightly fit in the socket in a manner that the bearing metal projects from the roof plane of the frame.

In the above-mentioned miniature electric motor, said bearing housing may be a separate unit which is fitted tightly or closely in the bore of a hollow cylindrical socket formed integrally with said frame and projecting outwardly and inwardly from said roof plane of said frame.

Alternatively, said bearing housing may be formed integrally with said frame as a hollow cylindrical socket in a manner that it plays both roles as it is.

In the above mentioned miniature electric motors, the positions of the bearing housing embracing the bearing metals and that of the hollow cylindrical socket contacting the housing may be staggered along the direction of the rotor shaft.

Alternatively, the positions of the sliding contact of said bearing metal with the rotor shaft and that of the contact of the hollow cylindrical socket and said bearing metal may be staggered along the direction of the rotor shaft.

Being configured as mentioned above, the miniature motor of the present invention has such an advantage that the perpendicularity is assured of the generators of the bore of the inner cylindrical face of the hollow cylindrical socket to the plane of the roof of the frame. Since the parallelism of the generators of the outer cylindrical face of the hollow cylindrical socket/bearing housing to the axis of the bore of the bearing metal is easily secured, the perpendicularity of the bore of the bearing metal, i.e., the rotor shaft, to the roof plane of the frame can also be assured.

A design where the hollow cylindrical socket serves as the bearing housing by itself is advantageous in the reduction of the manufacturing cost because the separate unit can be dispensed with.

By configuring the positional relation between the position of a sliding contact region of said bearing metal which rotatably supports the rotor shaft and the position of the part of the hollow cylindrical socket which supports said bearing metal directly or through the bearing housing in a staggered positional relation along the direction of the rotor shaft, the configuration has the below-mentioned advantage. That is, even when the separate bearing housing is press-fit into the bore of the hollow cylindrical socket, the dimension and accuracy of the bearing housing do not change. This can likewise be applicable to such a case where the hollow cylindrical socket also serves as the bearing housing as it is. Thus, the stabilized intrinsic circularity of the bore of the bearing metal can be assured.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

In the following paragraphs, the present invention will be described in more detail with reference to the attached drawings.

EXAMPLE 1

Figure 1:
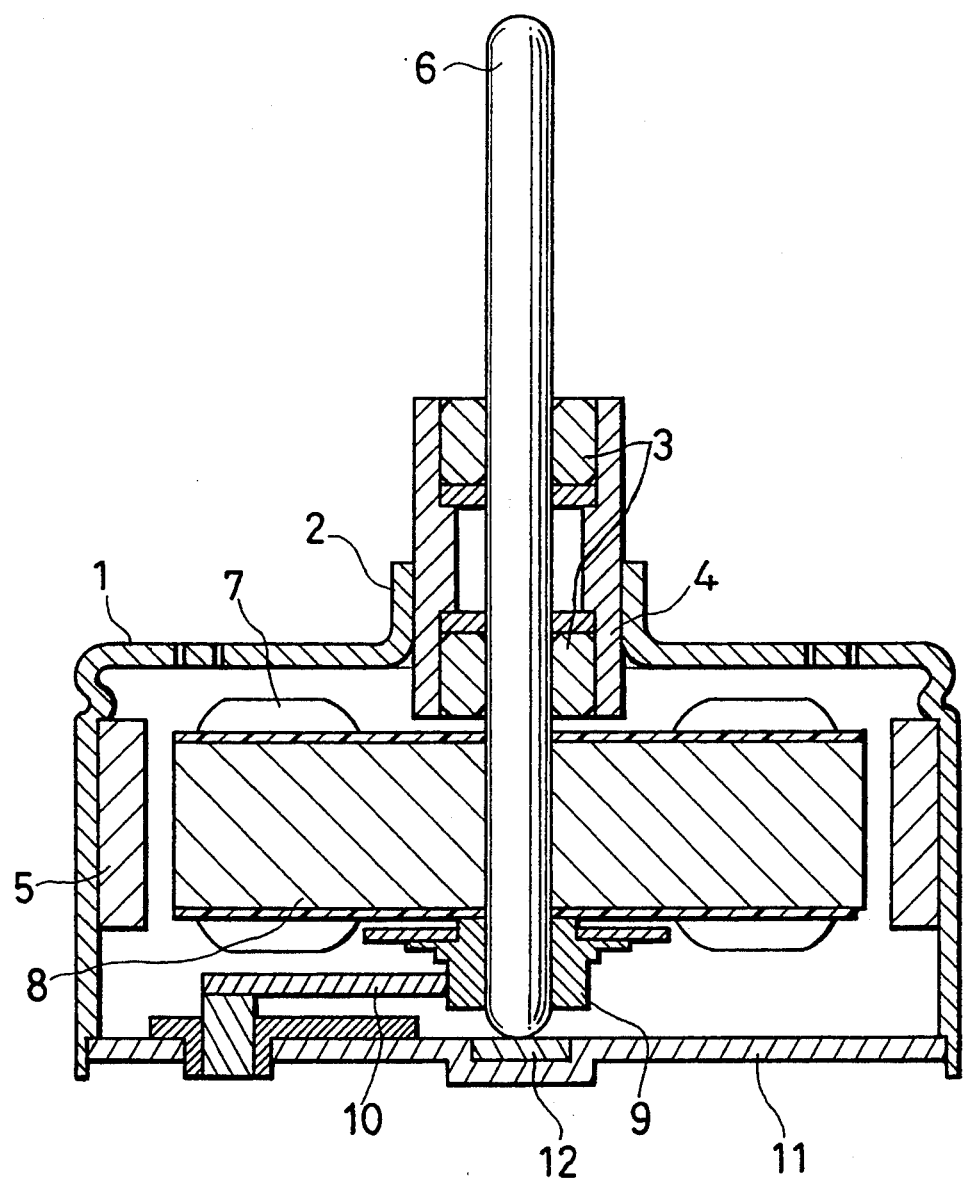
FIG. 1 is a cross-sectional view showing a miniature electric motor built in accordance with a first embodiment of the present invention.

As shown in FIG. 1, at the roof plane of the generally cylindrical bowl shaped frame 1, a hollow integral cylindrical socket 2 is formed by deep drawing so as to project outwardly from the center part of the roof plane. A bearing housing 4 is fitted tightly in the bore of said hollow cylindrical socket 2 in a manner that both end parts of the bearing housing 4 project from both ends of the socket 2. Thereafter, bearing metals 3 are fitted tightly in said bore from both ends of the bearing housing 4.

Magnets 5 are provided on the interior surface of said frame 1. A core 8 with coils 7 and a commutator 9 are fixed on the rotor shaft 6, which is then rotatably supported by the bearing metals 3. A bottom plate 11, which supports a brush 10 contacting with said commutator 9 and a thrust block 12 for receiving said rotor shaft 6, is provided on the lower open end of said Frame 1.

In the above-mentioned disclosed structure, the concentric hollow cylindrical socket 2 is formed on the roof plane of the frame 1 by deep drawing with a precise shape and position, and the bearing housing 4 is press-fit into the bore of the hollow cylindrical socket 2. Then, the bearing metals 3 are provided on both ends of the bearing housing 4 also by a tight fitting.

By being structured as stated above, the sufficient perpendicularity of the rotor shaft 6 to the installation plane of the frame can be ensured. This is achieved because the position, shape, direction and size of the inner cylindrical wall of the socket 2 can be finished with high precision by means of the deep drawing process.

EXAMPLE 2

Figure 2:
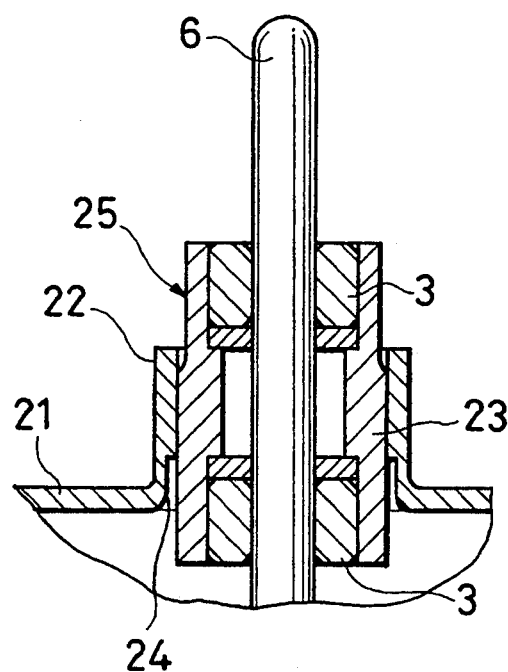
FIGS. 2, 3, 4, 5 and 6, are each a cross-sectional view showing an essential part of a miniature electric motor built in accordance with each of a second, third, fourth, fifth and sixth embodiments of the present invention.

FIG. 2 is a cross-sectional view showing the essential part of a miniature motor built in accordance with the second embodiment of the present invention. In this and subsequent figures, the same components as those in the first embodiment are designated by the corresponding reference numerals, and the descriptions made with reference to the first embodiment, similarly apply. Only modified parts and components are designated by new reference numerals and described in detail in this as well as subsequent embodiments.

As shown in FIG. 2, a stepped larger inner diameter region 24 is provided on the bore of the hollow cylindrical socket 22 at its root part, which is rising up from the frame 21. Another stepped smaller outer diameter region 25 is provided on the outer end of the bearing housing 23. In an assembled state, the positions of the bearing housing 23 at which the bearing metals 3 are accommodated, and the position the bearing housing 23 at which the supporting part of the hollow cylindrical socket 22 contacts the bearing housing 23, are selected to be staggered (in other words, not corresponding) along the direction of the rotor shaft 6.

Being thus configured, the dimension of the parts of the bearing housing 23, whereto the bearing metals 3 are accommodated, will not change even after the press-fitting of the bearing housing 23 into the bore in the hollow cylindrical socket 22 of the frame 21 in the assembling process. Thus, always uniformly controlled bore diameter and a sufficient intrinsic circularity of the bearing metals 3 are ensured. This is achieved because the position, shape, direction and size of the inner cylindrical wall of the socket 22 can be finished with high precision by means of the deep drawing process.

EXAMPLE 3

Figure 3:
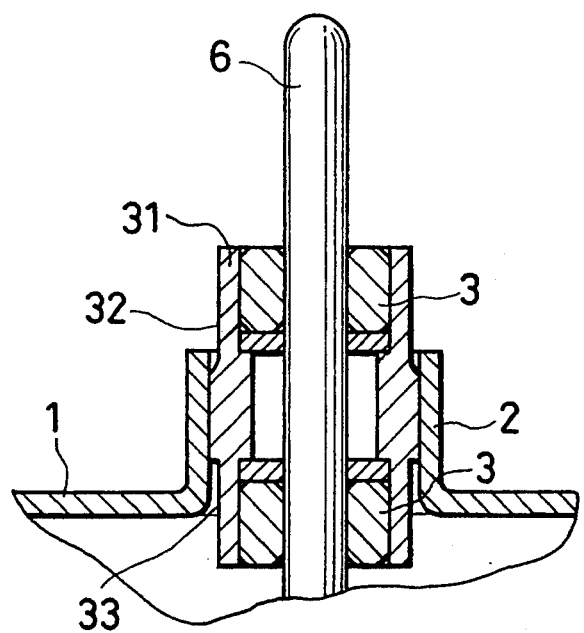

FIG. 3 is a cross-sectional view showing the essential part of a miniature motor built in accordance with the third embodiment of the present invention.

As shown in FIG. 3, an upper stepped smaller diameter region 32 and a lower stepped smaller diameter region 33 are provided on both outer end parts of the bearing housing 31. The hollow cylindrical socket 2 of the frame 1 is configured similarly to that shown in FIG. 1. In an assembled state, the positions of the bearing housing 31 where the bearing metals 3 are tightly fit, and the position of the bearing housing 31 where the supporting part of the hollow cylindrical socket 2 contacts are staggered along the direction of the rotor shaft 6.

Being thus configured, the dimension of the parts of the bearing housing 31 wherein the bearing metals 3 are accommodated will not change even if the bearing housing 31 Is press-fit into the bore in the hollow cylindrical socket 2 of the frame 1 in the assembling process. Thus, a stabilized bore diameter and a sufficient intrinsic circularity of the bearing metals 3 are ensured. This is achieved because the position, shape, direction and size of the Inner cylindrical wall of the socket 2 can be finished with high precision by means of the deep drawing process.

EXAMPLE 4

Figure 4:
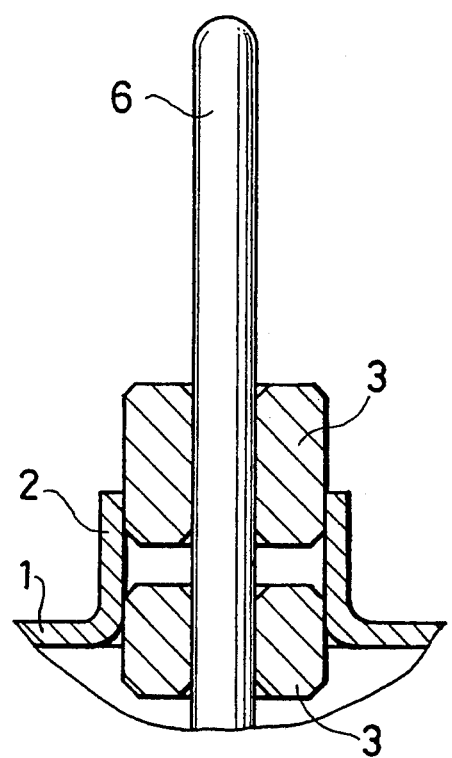

FIG. 4 is a cross-sectional view showing a miniature motor built in accordance with the fourth embodiment of the present invention.

As shown in FIG. 4, the integrally formed hollow cylindrical socket 2 of the frame 1 is designed so as to serve also as the bearing housing 4 which is shown in FIG. 1 of the first embodiment, whereby the construction is further simplified, and the process steps as well as the manufacturing cost are reduced accordingly with the similar advantages as those held by the first embodiment. This is realized because the position, shape, direction and size of the inner cylindrical wall of the socket 2 can be finished with high precision by means of the deep drawing process.

EXAMPLE 5

Figure 5:
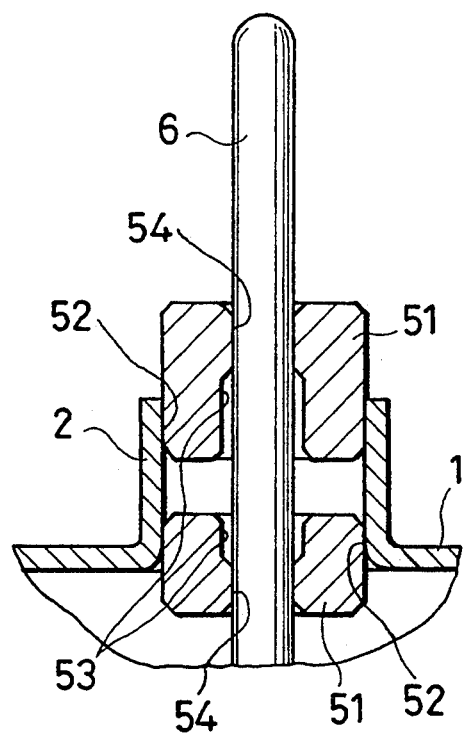

FIG. 5 is a cross-sectional view showing the essential part of a miniature motor built in accordance with the fifth embodiment of the present invention.

As shown in FIG. 5, a stepped larger inner diameter region 53 is provided on each of the inner end half parts of the bores of the bearing metals 51, whereby the lengths of the rotating sliding contact regions 54 of the bearing metals 51 are reduced. In an assembled state, the positions of the rotating sliding contact regions 54 of the bearing metals 51, which rotatably support the rotor shaft 6, and the positions of the stepped larger diameter regions 53 of the bore of the bearing metals 51, which correspond to the supporting part 52 of the hollow cylindrical socket 2, are staggered along the direction of the rotor shaft 6.

Being thus configured, even though the bearing metals 51 are press-fit into the bore in the hollow cylindrical socket 2 of the frame i in the assembling step, the bearing metals 51 will not be pressed against the rotor shaft 6, by virtue of the stepped larger inner diameter regions 53 of the bearing metals 51 which correspond to the hollow cylindrical socket 2. Thus the stepped larger inner diameter regions 53 produce a clearance between the bore of the bearing metals 51 and the rotor shaft 6, thereby preventing undesirable pressing the rotor shaft 6, and hence a stabilized bore diameter and a sufficient intrinsic circularity of the bearing metals 51 is ensured. This is achieved because the position, shape, direction and size of the inner cylindrical wall of the socket 2 can be finished with high precision by means of the deep drawing process.

EXAMPLE 6

Figure 6:
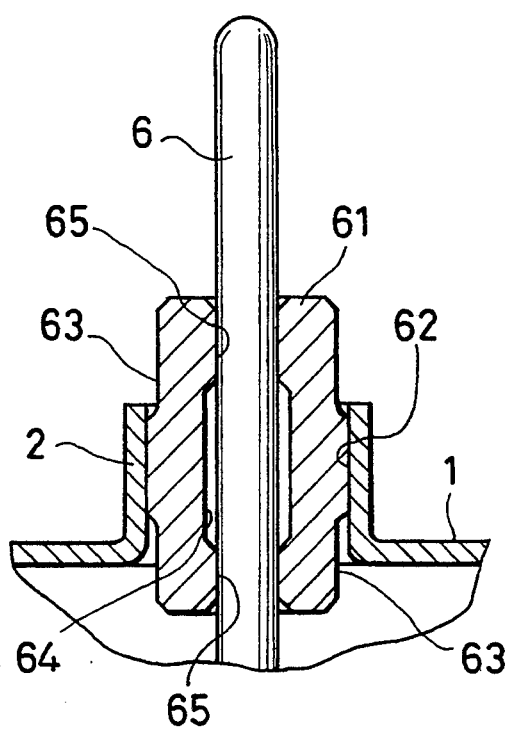
Figure 7:
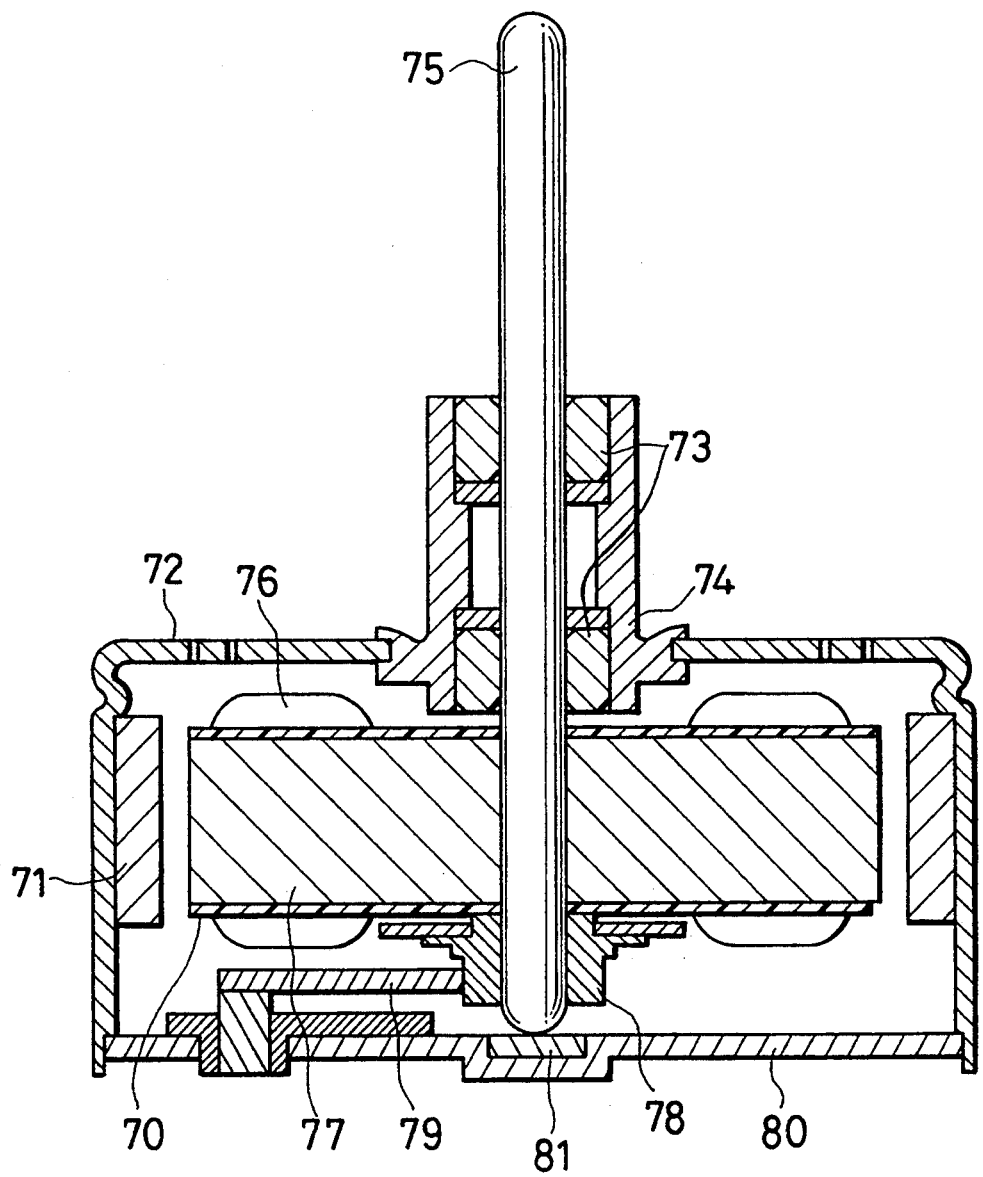
FIG. 7 is a cross-sectional view showing an example of the conventional miniature motor.

FIG. 6 is a cross-sectional view showing the essential part of a miniature motor built in accordance with the sixth embodiment of the present invention.

As shown in FIG. 6, a stepped larger inner diameter region 64 with a considerable length is provided in the mid part of the bore of the single bearing metal 61. Thereby, the lengths of the sliding contact regions 65 to the rotor shaft 6, which correspond to both end parts of the bearing metals 61, are reduced accordingly. In addition to this, outer stepped smaller diameter regions 63 are provided on both end parts of the bearing metal 61 with some overlapping in the axial direction with the larger inner diameter region 64 in the bore of the bearing metal 61 along the lengthwise direction. In an assembled state, the positions of the rotating sliding contact regions 65 of the bearing metal 61 where it contacts the rotor shaft 6, and the position of the stepped larger diameter region 64 of the bearing metal 63 which corresponds to the supporting part 62 of the hollow cylindrical socket 2, are selected to be staggered along the direction of the rotor shaft 6.

Being thus configured, even though the bearing metal 61 are press-fit Into the bore in the hollow cylindrical socket 2 of the frame 1 in the assembling process, the bearing metal 61 will not be pressed against the rotor shaft 6 by virtue of the stepped larger inner diameter region 64 of the bore of the bearing metal 61, which corresponds to the hollow cylindrical socket 2. Thus the stepped larger inner diameter region 64 produces a sufficient clearance between the bearing metal 61 and the rotor shaft 6 thereby prevents undesirable pressing to the rotor shaft 6. Also, in this case, a stabilized bore diameter and a sufficient intrinsic circularity of the bearing metal 61 is ensured. This is achieved because the position, shape, direction and size of the inner cylindrical wall of the socket 2 can be finished with high precision by means of the deep drawing process.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A miniature electric motor comprising:
   a rotor having a rotor shaft;
   a stator; and
   a single-piece frame top of generally cylindrical bowl shape for supporting said stator and said rotor;
   a frame bottom secured to said frame top forming a frame enclosing said stator and said rotor;
   said single-piece frame top forming a hollow cylindrical socket for holding a bearing structure projecting both outwardly and inwardly from a roof plane of said frame; and
   said bearing structure comprising at least one bearing metal, said bearing structure being tightly fit in said socket of said frame and projecting both outwardly and inwardly from said roof plane of said frame, said bearing structure having a first and a second rotating sliding contact point to said rotor shaft;
   wherein a predetermined clearance is formed in the direction of an axis of said rotor shaft between said first rotating sliding contact point and said second rotating sliding contact point.

2. The miniature electric motor in accordance with claim 1, wherein said bearing structure further comprises a bearing housing.

3. The miniature electric motor in accordance with claim 1, wherein said bearing structure projects only outwardly from said roof plate of said frame.

4. The miniature electric motor in accordance with claim 1 or 2, wherein positions along said axis of said rotor shaft where said bearing structure contacts said socket, and where said first rotating sliding contact point contacts said rotor shaft, are staggered with each other along the direction of said axis of said rotor shaft.

5. The miniature electric motor in accordance with claim 1, wherein positions along said axis of said rotor shaft where said bearing structure contacts said socket, and where said first and said second rotating sliding contact points contact said rotor shaft, are staggered with each other along the direction of said axis of said rotor shaft.

* * * * *